March 3, 1953 G. R. CHURCHILL 2,629,961
FISHING LURE
Filed Sept. 2, 1949
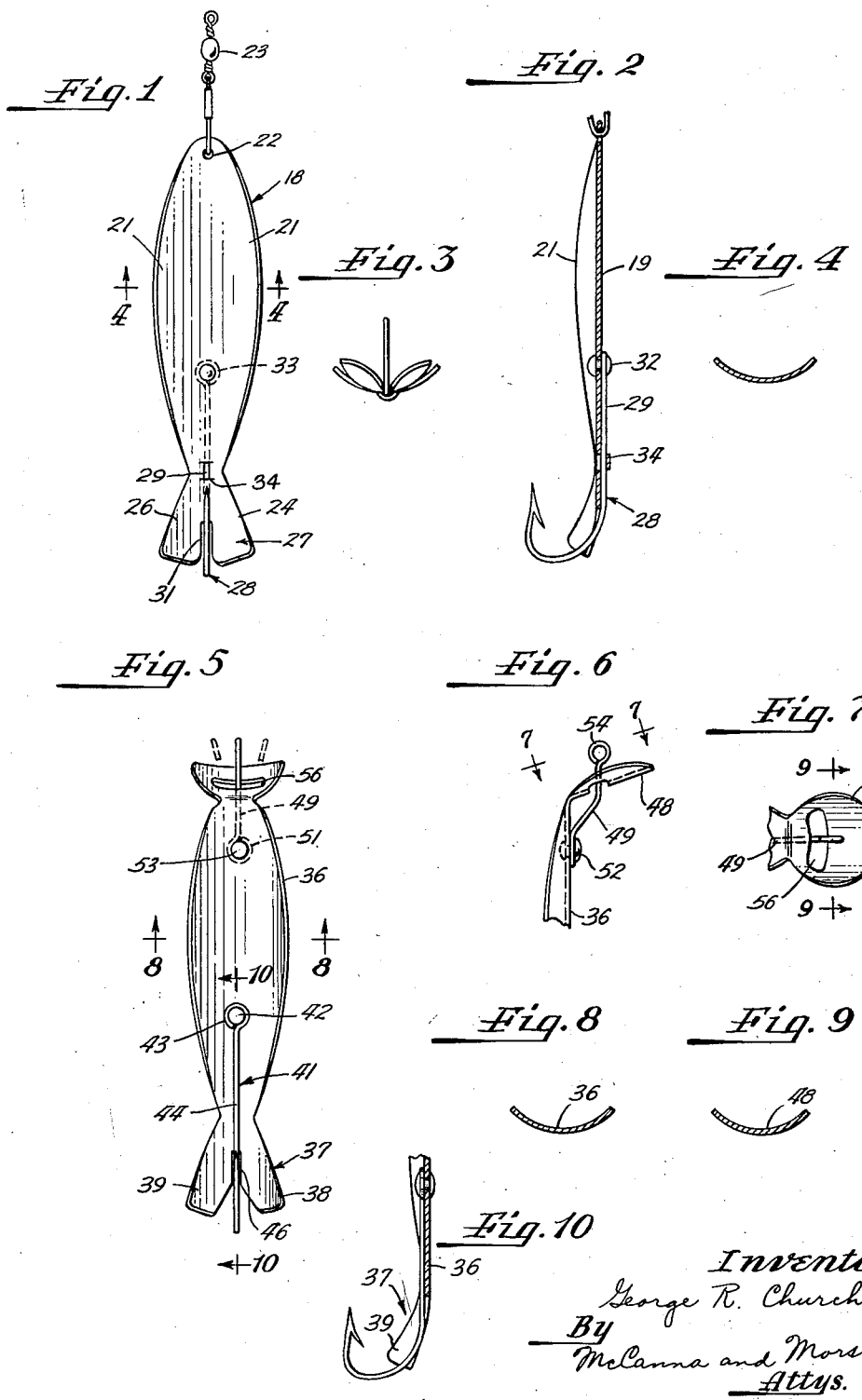
Inventor
George R. Churchill
By McCanna and Morsbach
Attys.

Patented Mar. 3, 1953

2,629,961

UNITED STATES PATENT OFFICE 2,629,961

FISHING LURE

George R. Churchill, Oregon, Ill.

Application September 2, 1949, Serial No. 113,803

1 Claim. (Cl. 43—42.52)

This invention relates to fishing lures and more particularly to lures of the spoon type.

An object of the invention is to provide a lure of the above character in which the lure has a novel wobbling or oscillating motion as it is pulled through the water.

Another object of the invention is to provide a lure of the above character which is highly effective in catching fish, which is sturdy in construction, which is rugged, and which may be manufactured in a relatively inexpensive manner.

Another object of the invention is to provide a novel lure of the above character that is suitable for use in shallow water.

Other objects and advantages of the invention will become apparent from the following detailed description taken in connection with the accompanying drawings, in which—

Figure 1 is a plan view of a lure embodying the present invention;

Fig. 2 is a side sectional view taken substantially along the longitudinal axis of the lure;

Fig. 3 is a rear end view of the lure;

Fig. 4 is a sectional view taken substantially through the line 4—4 of Figure 1;

Fig. 5 shows a modified form of the present invention;

Fig. 6 is a fragmentary side view of the head of the lure shown in Fig. 5;

Fig. 7 is a sectional view taken substantially along the line 7—7 of Fig. 6;

Fig. 8 is a sectional view taken substantially along the line 8—8 of Fig. 5;

Fig. 9 is a sectional view taken substantially along the line 9—9 of Fig. 7, and Fig. 10 is a fragmentary side sectional view of the tail of the lure shown in Fig. 5.

Referring now to the drawings, the invention is shown embodied in a fishing lure of the spoon type. In general, the lure comprises an elongated body 18 having a straight central portion 19 extending lengthwise of the body and side portions 21 deformed to define a body having a concavo-convex cross section throughout its length. The front end of the body 18 is generally rounded and is formed with a hole 22 to permit the attachment of a common swivel connection 23 connected to a fish line, not shown. At its rear end the body 18 tapers gradually and then flares outwardly in the form of lateral extensions 24 and 26 on each side of the longitudinal axis of the body to form a tail 27. The lateral extensions 24 and 26 are curved generally in the direction of the concave surface of the body 18 so that the tail 27 also has a generally concavo-convex cross section. To minimize manufacturing costs, the tail and body may be formed as a single metal stamping. Preferably the concave and convex surfaces are highly polished to reflect light readily.

A hook 28 is secured to the body in a suitable manner. As shown in Figs. 1-4, a shank 29 of the hook 28 is in substantial alinement with the longitudinal axis of the body and is disposed in overlying contiguous relation with the convex surface of the body 18. At one end the shank 29 projects through a slot 31 formed at the extreme rear end of the tail 27. The barbed portion of the hook 28 is disposed in spaced relation to the concave surface of the tail. A rivet 32 extending through the body 18 and a loop 33 on the shank of the hook 28 secures the latter to the body 18. The shank 29 of the hook extends through an opening defined by a strip portion 34 and the body 18. The portion 34 is formed by cutting the body intermediate its side edges along spaced transversely extending lines and depressing the portion intermediate the cuts outwardly away from the body. The portion 34 is shaped so that when the rivet is in position the portion 34 serves to securely position the shank of the hook. When this lure is pulled through the water as in casting, the water reacts on the lateral extensions 24 and 26 defining the tail to cause the body 18 to rock about its longitudinal axis.

In Figs. 5-10 there is shown another embodiment of the invention. In general, this form comprises a body 36 having a concavo-convex cross section and tapering at its front and rear ends. A tail 37 extending rearwardly of the hook is formed by lateral extensions 38 and 39 connected to the body 36. These extensions extend laterally on each side of the longitudinal axis of the body and are pre-shaped to define a tail having a concavo-convex cross section. Preferably the tail 37 curves or is inclined with respect to the longitudinal axis in the direction of the concave surface as best shown in Fig. 10. A hook 41 is secured to the body 36 as by a rivet 42 extending through a loop 43 of the hook. The shank 44 of the hook is in contiguous relation with the concave side of the body 36 and the portion of the shank spaced directly opposite to the barb of the hook is received in a slot 46, formed in between the lateral extensions 38 and 39, and being relatively narrow adjacent the body and flaring at the extreme rear end of the tail 37. Preferably the side walls defining the slot 46 are spaced apart a width corresponding to the diameter of the stock forming the hook so that the hook is held in position against lateral movement when the curved portion of the hook adjacent the barb is received in the slot. At its front end, the body is formed with a lip or head 48 which is inclined at an angle with respect to the longitudinal axis of the body 36 as shown in Fig. 6 in the direction of the convex surface. The head 48 is generally rounded as seen in Fig. 7 and has a concavo-convex cross section as seen in Fig. 9.

A link 49 is secured to the front end of the body 36 at a position spaced rearwardly from the connection between the body 36 and the head 43. The link 49 is formed with an eye 51 at one end shaped to receive a rivet 52 for pivotally securing the link 49 to the body 36. The opposite end of the link 49 is offset with respect to the eye 51 and is formed with an eye 54. The link extends through a transversely extending slot 56 formed in the head 48 so that the eye 54 is in spaced relation to the concave surface of the head 48. As shown, the slot 56 is disposed intermediate the ends of the head and is shaped to permit free movement of the link between opposed positions on opposite sides of the longitudinal axis of the body (see Fig. 5) and at the same time permit only limited movement of the link toward and away from the longitudinal axis of the body. The eye 54 provides a connection for attaching the lure to a fish line.

When this lure is pulled through the water as in casting, the water reacts on the tail 37 to cause the lure to rock about its longitudinal axis. As the body 36 rocks the water also reacts on the head 48 to cause the lure to be deflected from the path coinciding with its longitudinal axis. When the sides of the lure are at the same level, the head 48 causes the lure to dive downwardly. When the body is rocked so that one side of the lure is higher than the other the deflection due to the reaction of the water on the head is such as to move the lure in one lateral direction, and when the body has rocked so that the first side is lower than the other side the deflection is in the opposite lateral direction. Also when one side of the lure is higher than the other, the lure is pulled upwardly by the casting line. The movement of the lure can best be summarized as being a composite side to side, down and up movement superimposed onto the rocking movement as it is pulled through the water. The faster the lure is pulled through the water the deeper it tends to go. Thus, by controlling the speed with which the lure is pulled through the water, it is possible to control the elevation of the lure in the water. By inclining the tail 37 as shown in Fig. 10 with respect to the longitudinal axis of the body and applying a pulling force at a point substantially intermediate the ends of the head, a fish lure results that tends to maintain an even path of travel as it is pulled through the water. Consequently this lure may be used in relatively shallow water as well as deep water.

This application is a continuation in part of my copending application Serial No. 24,891, filed May 3, 1948, now abandoned.

I claim:

A fishing lure of the spoon type, comprising a body having a generally concavo-convex cross section and tapering at its front and rear ends, lateral extensions connected to the rear end of the body, said extensions being disposed on opposite sides of the longitudinal axis of the body and throughout their extent inclined generally with respect thereto in the direction of the concave surface, a hook secured to the body, a head secured to the front end of the body and having a concavo-convex cross section with its convex surface facing rearwardly, said head depending from the front end of the body and having a transversely extending slot intermediate its ends, a rigid link extending through said slot and having an end shaped to be attached to a casting line and an end disposed in side by side relation with the convex under surface of the body at a substantial distance from the front end of the body, and means engageable with said last mentioned end for pivotally connecting the link to the body at said end for applying to the body a pulling force through said link and to permit relative swinging movement of the link and body.

GEORGE R. CHURCHILL.

REFERENCES CITED

The following references are of record in the file of this patent:

UNITED STATES PATENTS

| Number | Name | Date |
| --- | --- | --- |
| 1,314,052 | Dubrow | Aug. 26, 1919 |
| 1,683,933 | Teshima | Sept. 11, 1928 |
| 1,806,088 | Schnell | May 19, 1931 |
| 1,861,905 | Bergstedt | June 7, 1932 |
| 1,963,380 | Peters et al. | June 19, 1934 |
| 2,023,918 | De Witt | Dec. 10, 1935 |
| 2,214,409 | Eaby | Sept. 10, 1940 |
| 2,254,981 | Sisco | Sept. 2, 1941 |
| 2,394,132 | Zeibig | Feb. 5, 1946 |
| 2,415,633 | Hietala | Feb. 11, 1947 |
| 2,570,474 | Novitzky | Oct. 9, 1951 |